(12) United States Patent
Leung et al.

(10) Patent No.: US 6,400,697 B1
(45) Date of Patent: *Jun. 4, 2002

(54) METHOD AND APPARATUS FOR SECTOR BASED RESOURCE ALLOCATION IN A BROADHAND WIRELESS COMMUNICATIONS SYSTEM

(75) Inventors: Kin K. Leung, Edison; Nemmara K. Shankaranarayanan, Bridgewater; Arty Srivastava, Ocean, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,548

(22) Filed: Jan. 15, 1998

(51) Int. Cl.[7] .............................. H04Q 7/00; H04J 5/00
(52) U.S. Cl. ........................ 370/328; 370/337; 455/446
(58) Field of Search ................................. 370/328, 329, 370/330, 336, 337, 345, 347–348; 455/446, 447, 448, 449, 67.3, 450–452, 443; 342/354, 360, 428–430

(56) References Cited

U.S. PATENT DOCUMENTS

| 4,144,411 A | | 3/1979 | Frenkiel | |
| 5,038,399 A | | 8/1991 | Bruckert | |
| 5,185,739 A | * | 2/1993 | Spear | 370/337 |
| 5,627,830 A | * | 5/1997 | Kotzin | 370/336 |
| 5,649,292 A | * | 7/1997 | Doner | 455/447 |
| 5,666,651 A | * | 9/1997 | Wang | 455/512 |
| 5,694,396 A | * | 12/1997 | Friouzbakht et al. | 370/480 |
| 5,752,193 A | * | 5/1998 | Scholefield et al. | 455/452 |
| 5,774,790 A | * | 6/1998 | Dupuy | 370/337 |
| 5,889,494 A | * | 3/1999 | Reudink et al. | 342/373 |
| 5,943,425 A | * | 8/1999 | Mizikovsky | 455/433 |
| 5,974,323 A | * | 10/1999 | Doner | 455/447 |
| 5,999,818 A | * | 12/1999 | Gilbert et al. | 455/448 |
| 6,011,786 A | * | 1/2000 | Dent | 370/330 |
| 6,047,186 A | * | 4/2000 | Yu | 455/447 |

OTHER PUBLICATIONS

Samuel W. Halpern, "Reuse Partitioning in Cellular Systems," 33rd IEEE Vehicular Technology Congerence pp 322–327 (1983).

* cited by examiner

Primary Examiner—Huy D. Vu
Assistant Examiner—Steven Nguyen

(57) ABSTRACT

A method and apparatus for sector based resource allocation in a broadband wireless communications system. A service region is divided into a plurality of cells, and each cell is divided into a plurality of labeled sectors. Each label is selected to avoid an unacceptable amount of interference from any other sector while ensuring that at least two sectors in a cell share the same label. Transmissions are scheduled for a cell by assigning each communications site a channel, such as a time slot associated with the sector's label. The transmissions are then communicated according to this schedule.

33 Claims, 15 Drawing Sheets

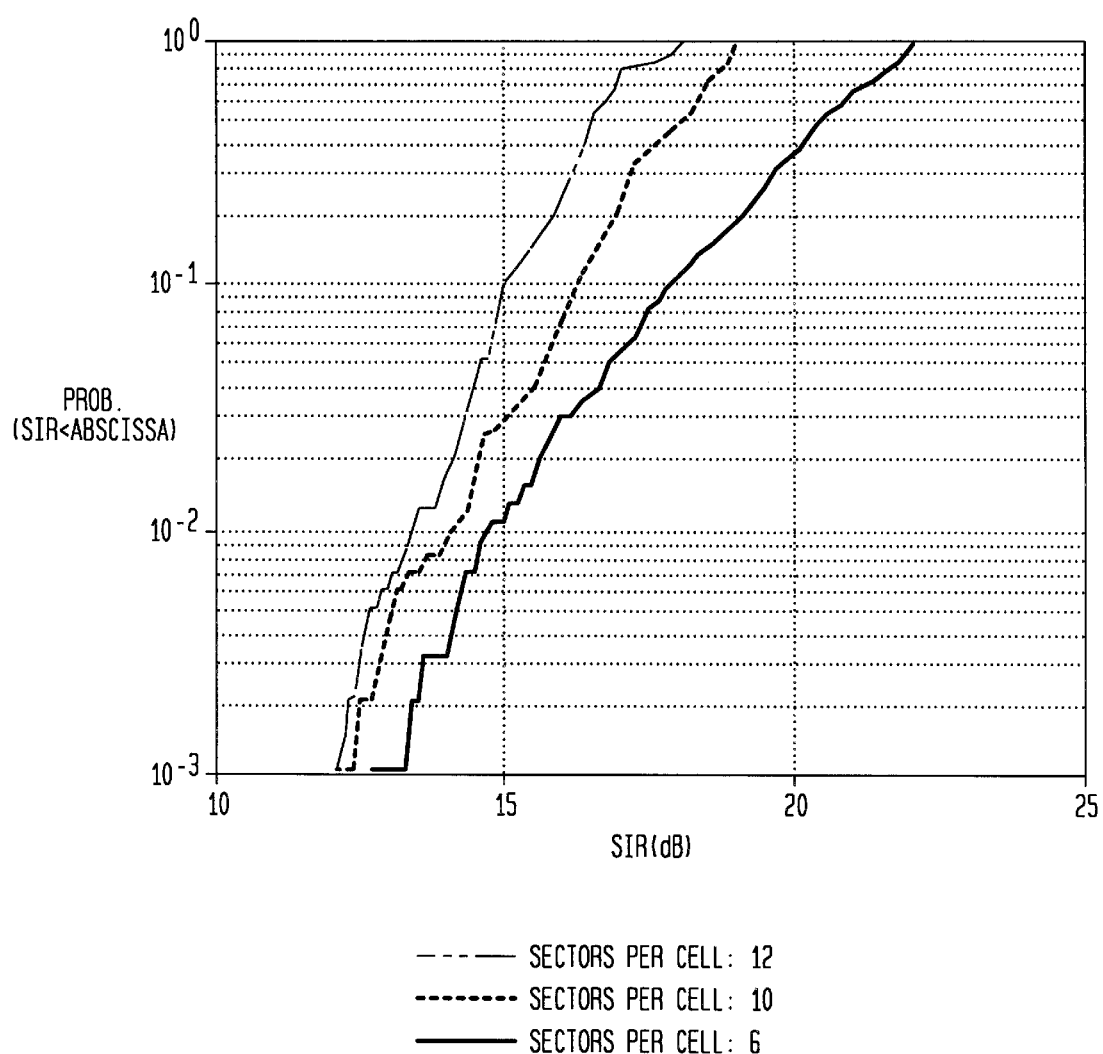

METHOD AND APPARATUS FOR SECTOR BASED RESOURCE ALLOCATION IN A BROADBAND WIRELESS COMMUNICATIONS SYSTEM

CROSS REFERENCE TO RELATED APPLICATIONS

The subject matter of the present application is related to the subject matter of U.S. patent application Ser. No. 08/775,466 entitled "Method and Apparatus for Providing High Speed Services Using a Wireless Communications System" to Thomas K. Fong, Paul Shala Henry, Kin K. Leung, xiaoxin Qiu, Nemmara K. Shankaranarayanan and assigned to AT&T Corp., filed on Dec. 30, 1996, U.S. patent application Ser. No. 08/832,546 entitled "Method and Apparatus for Resource Assignment in a Wireless Communications System" to Xiaoxin Qiu and Kapil Chawla, filed Apr. 3, 1997 and U.S. patent application Ser. No. 08/982,510 entitled "Dynamic Resource Allocation Method and Apparatus for Broadband Services in a Wireless Communications System" to Kin K. Leung and Arty Srivastava, filed Dec. 2, 1997, the entire disclosures of which are hereby incorporated by reference.

FIELD OF THE INVENTION

The invention relates to wireless communications systems. More particularly, the invention relates to a method and apparatus for sector based resource allocation in a broadband wireless communications system.

BACKGROUND OF THE INVENTION

The need for high-speed broadband packet services will grow tremendously as telecommuting and Internet access become increasingly popular. Customers will expect high quality, reliable access to high-speed communications from homes and small businesses in order to access, for example: (a) the World Wide Web for information and entertainment; (b) office equipment and data from home at rates comparable to Local Area Networks (LANs); and (c) multimedia services such as voice, image and video. Although varying with application, effective broadband communication requires a bandwidth sufficient to permit a data rate up to the range of several tens of Mega-bits per second (Mbps).

Traditional wireless communications systems have a problem delivering high-speed services because of the amount of bandwidth these services require. Bandwidth is a key limiting factor in determining the amount of information that a system can transmit to a user at any one time. The concept of bandwidth may be better understood using an analogy. If information carried by a network were water, and links between communication sites were pipes, the amount of water (i.e., information) a network could transmit from one site to another site would be limited by the diameter of the pipes carrying the water. The larger the diameter of the pipe, the more water (i.e., information) can be transmitted from one site to another in a given time interval. Likewise, the more bandwidth a communications system has available to it, the more information it can carry.

Traditional wired communications systems using modems and a physical transmission medium, such as twisted pair copper wire, cannot currently achieve the data rates necessary to deliver high-speed service due to bandwidth limitations (i.e., small pipes). Promising technologies for "broadband" (i.e., large pipes) access include the Asymmetrical Digital Subscriber Loop (ADSL) and Hybrid Fiber-Coax (HFC). These wired-network approaches to providing high-speed access, however, could be expensive and time consuming to install.

The benefit of wireless systems for delivering high-speed services is that they can be deployed rapidly without installation of local wired distribution networks. However, traditional wireless systems such as narrowband cellular and Personal Communications Services (PCS) are bandwidth limited (small pipes) as well. As an alternative, wireless solutions such as Multichannel Multipoint Distribution Service (MMDS) and Local Multichannel Distribution Service (LMDS) have become attractive but these solutions presently offer limited uplink channel capacity. Moreover, these solutions in their current system design may not be capable of supporting a large number of users.

One solution for solving the bandwidth limitation problem for wireless systems is to maximize the available bandwidth through frequency reuse. Frequency reuse refers to reusing a common frequency band in different area, or "cells," within the system. Refer, for example, to FIG. 1 which shows a typical wireless communication system. A Base Station (BS) 20 communicates with several Terminal Stations (TS) 22. The BS 20 is usually connected to a fixed network 24, such as the Public Switched Telephone Network (PSTN) or the Internet. The BS 20 could also be connected to other base stations, or a Mobile Telephone Switching Office (MTSO) in the case of a mobile system. Each TS 22 can be either fixed or mobile.

The BS 20 communicates information to each TS 22 using radio signals transmitted over a range of carrier frequencies. Frequencies represent a finite natural resource, and are in extremely high demand. Moreover, frequencies are heavily regulated by the government. Consequently, each cellular system has access to a very limited number of frequencies. Accordingly, wireless systems attempt to reuse frequencies in as many cells within the system as a possible. To accomplish this, frequency reuse patterns are designed for cellular systems. A major factor in designing a frequency reuse pattern is the attempt to maximize system capacity while maintaining an acceptable Signal-to-Interference Ratio (SIR) for correct signal detection. SIR refers to the ratio of the level of the received desired signal to the level of the received undesired signal.

To achieve frequency reuse, a cellular system takes the total frequency spectrum allotted to the system and divides it into a set of smaller frequency bands. The geographic area covered by a cellular communications system is organized into cells and/or sectors, with each cell typically containing a plurality of communications sites, such as a BS 20 and TS 22. The cells can be any number of shapes, such as a hexagon, and groups of cells can be formed with each cell in the group employing a different frequency band. These groups can be repeated until the entire service area is covered. Thus, in essence, the frequency reuse pattern determines the distance between cells that use common frequency bands. The goal of a pattern is to keep interference due to the common use of the same frequency band in different cells, or "co-channel" interference, below a given threshold to ensure successful signal reception. The advantage of this frequency reuse plan to manage co-channel interference can also be achieved by a time domain approach. In such an approach, the whole frequency spectrum is used for each transfer, but time is divided into frames, each of which consists of multiple frames. Different frames are reused in various cells in a way similar to frequency reuse patterns, as discussed above. Thus, there is a direct analogy between frequency bands and time frames.

Although the reuse of bandwidth in cellular systems is limited by this co-channel interference, directional antennas at both the BS and the TS in fixed wireless systems can help reduce the amount of interference from neighboring sectors and cells. U.S. patent application Ser. No. 08/775,466 discloses a Staggered Resource Allocation (SRA) method which uses a distributed, dynamic resource allocation algorithm for fixed wireless networks where the same spectrum is shared by every sector and cell on a dynamic, time basis. Relying on directional antennas to suppress interference, the algorithm schedules concurrent packet transmissions in various sectors and cells that cause little interference to each other, while sectors causing major interference to each other do not transmit simultaneously. There is a specific sequence in which sectors are labeled, and a specific schedule in which time sub-frames are used in each sector. As a result, the SRA scheme can yield a throughput in excess of 30% per sector for typical scenarios.

In such systems, a small fraction of terminals, typically near a cell boundary, will experience shadow fading conditions where interference cannot be adequately suppressed by the finite Front-to-Back (FTB) gain ratios of the terminal antennas. Techniques are available to increase the cell coverage to include such "vulnerable" terminals. For example, U.S. patent application Ser. No. 08/832,546 discloses a Time Slot Reuse Partitioning (TSRP) method which uses multiple time domain reuse patterns which provide different SIR characteristics. Terminals are categorized based on SIR requirements and assigned to different reuse patterns, i.e. they use time slots allocated to the respective patterns. A time frame is divided into portions that are "shared" in a cell and "dedicated" portions that are not shared. The dedicated portions are used for the vulnerable terminals to ensure an adequate SIR. An Enhanced SRA (ESRA) scheme, such as the one described in U.S. patent application Ser. No. 08/982,510 can augment the sector labeling scheme and modify the SRA transmission schedule to protect the vulnerable terminals.

It is known that a practical directional antenna used at a base station to cover a sector (referred to as a sector antenna) will have a radiation pattern that overlaps with those of adjacent sectors. A representative directional antenna pattern, and the sector 202 that it covers, is shown in FIG. 2. If the same frequency were used simultaneously in adjacent sectors 204, 206, it is likely that a user terminal would receive strong interference from adjacent sectors for the downlink. Similarly for the uplink, base station antennas of adjacent sectors can receive strong interference from terminals located at the sector boundary. With practical directional antennas, in most cases, no two adjacent sectors should use the same channel. Thus, the SRA method, developed with an ideal antenna pattern assumption, faces performance limitations.

Another problem with known techniques such as the SRA, ESRA and TSRP methods is that they cannot easily handle an increase in the number of users or the amount of traffic after the base stations are set up and terminal antennas are adjusted to point to their associated base stations. Besides the obvious option of using more spectrum, higher capacity is usually achieved by increasing the number of cells or the number of sectors per cell. The common practice of increasing the number of cells, or "cell splitting," for capacity growth is not a good option for fixed wireless networks because the existing directional terminal antennas in the new cell must be re-oriented to a new base—a huge and undesirable task. Moreover, sector splitting will be very involved, such as changing the time-slot assignment sequence for all sectors in the SRA and ESRA methods or re-evaluating the SIR characteristics of all terminals in the TSRP method with additional new sectors.

Finally, a sector labeling plan and time reuse pattern should be robust enough to allow for the inevitable deviations from a regular cell layout. Due to terrain variations and differences in the volume of traffic expected in an area, cells may not be of exactly equal size and shape. Similarly, the number and size of sectors may not always be the same in each cell. Such deviations are not easily achieved with known techniques.

In view of the foregoing, it can be appreciated that a substantial need exists for a method and apparatus for resource allocation in a broadband wireless communications system that accounts for realistic antenna patterns, capacity growth, non-uniform traffic density and irregular cell layout, and solving the other problems discussed above.

SUMMARY OF THE INVENTION

The disadvantages of the art are alleviated to a great extent by the method and apparatus for resource allocation in a broadband wireless communications system. A service region is divided into a plurality of cells, and each cell is divided into a plurality of labeled sectors. Each label is selected to avoid an unacceptable amount of interference from any other sector while ensuring that at least two sectors in a cell share the same label. Transmissions are scheduled for a cell by assigning each communications site a channel, such as a time slot, associated with the sector's label. The transmissions are then communicated according to this schedule.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 15 shows the signal-to-interference ratio distribution for different numbers of sectors per cell according to an embodiment of the present invention.

DETAILED DESCRIPTION

The present invention is directed to a method and apparatus for resource allocation in a broadband wireless communications system. In particular, the present invention, referred to herein as Sector Based Resource Allocation (SBRA), is designed to exploit the use of practical directional sector antennas at a base station. Briefly, sectors in a cell can be labeled such that adjacent sectors do not use the same label and the same labels are not used in the first tier of neighboring cells. As in the SRA and TSRP methods, sectors with the same label can communicate using the same group of time slots, called a "subframe." Although SBRA is described herein with respect to time-domain reuse where a channel is a time-slot, the invention also applies to frequency/time and frequency channels, and channels using different codes.

Figure 3:
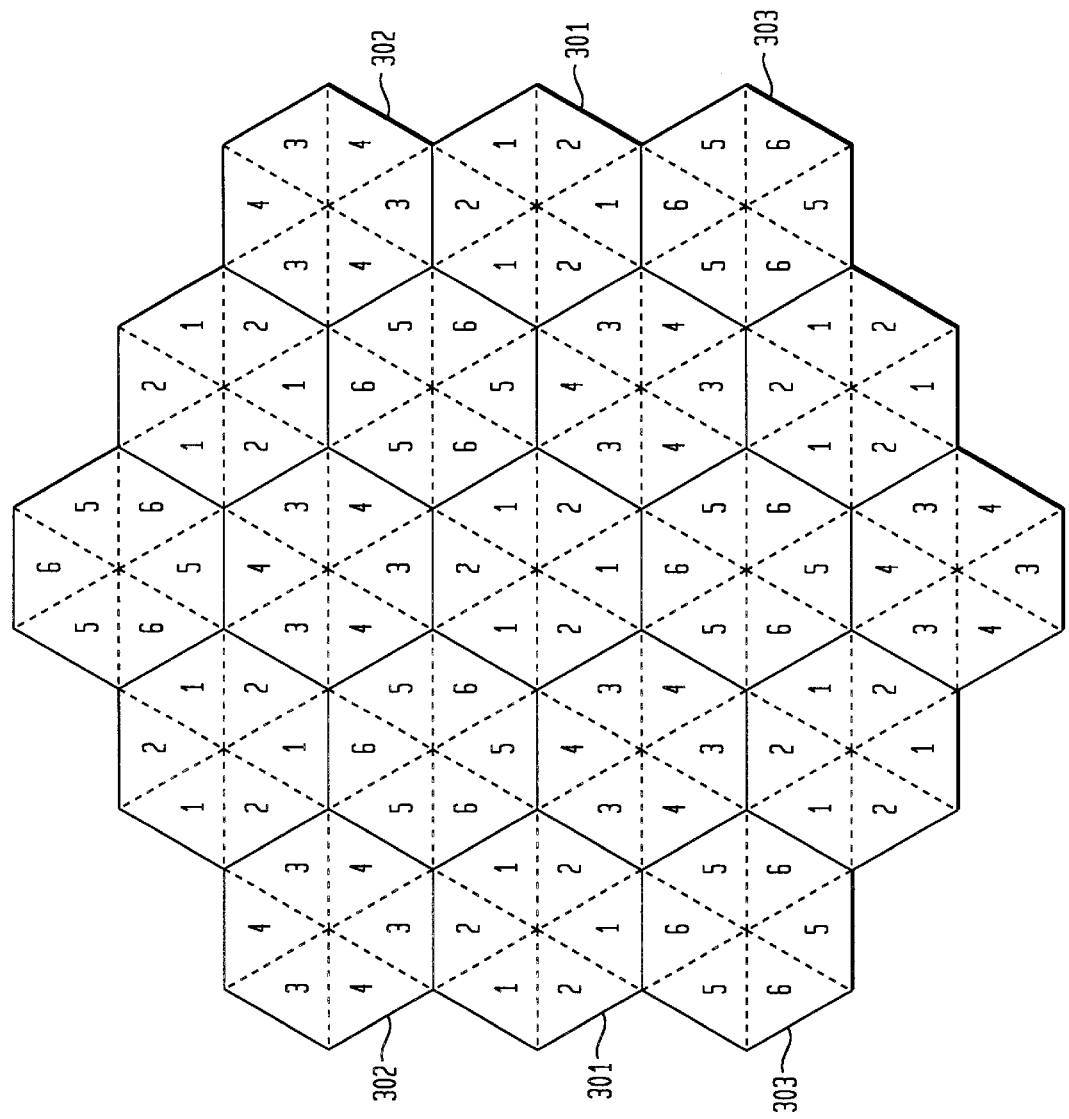
FIG. 3 shows a sector based resource allocation method for a reuse pattern of 3 according to an embodiment of the present invention.

Referring now in detail to the drawings wherein like parts are designated by like reference numerals throughout, there is illustrated in FIG. 3 an SBRA labeling pattern for a hexagonal cell system having six sectors per cell and a reuse pattern with three different types of cells 301, 302, 303. According to an embodiment of the present invention, cell type A 301 uses sector labels 1 and 2, cell type B 302 uses labels 3 and 4, and cell type C 303 uses labels 5 and 6. Note that for all cell types every other sector of a cell has the same label. This reuse pattern of three cell types ensures that no two adjacent cells have the same type, or "labeling pattern," which reduces the co-channel interference to nominal levels. For a hexagonal layout, three cell types are sufficient to repeatedly and uniformly label all cells in the system.

As for the assignment of time slots to transmit information between communications sites, sectors with the label i can schedule packet transmission in subframe i for i=1 to 6. As a result, each sector can transmit on a 16.7% duty cycle, consuming at most one-sixth of the total bandwidth. The total network capacity, however, is increased because three sectors with identical labels in each cell transmit simultaneously. SBRA supports such a high degree of concurrent packet transmission because of the relatively high directivity and position of the BS antennas.

Figure 4:
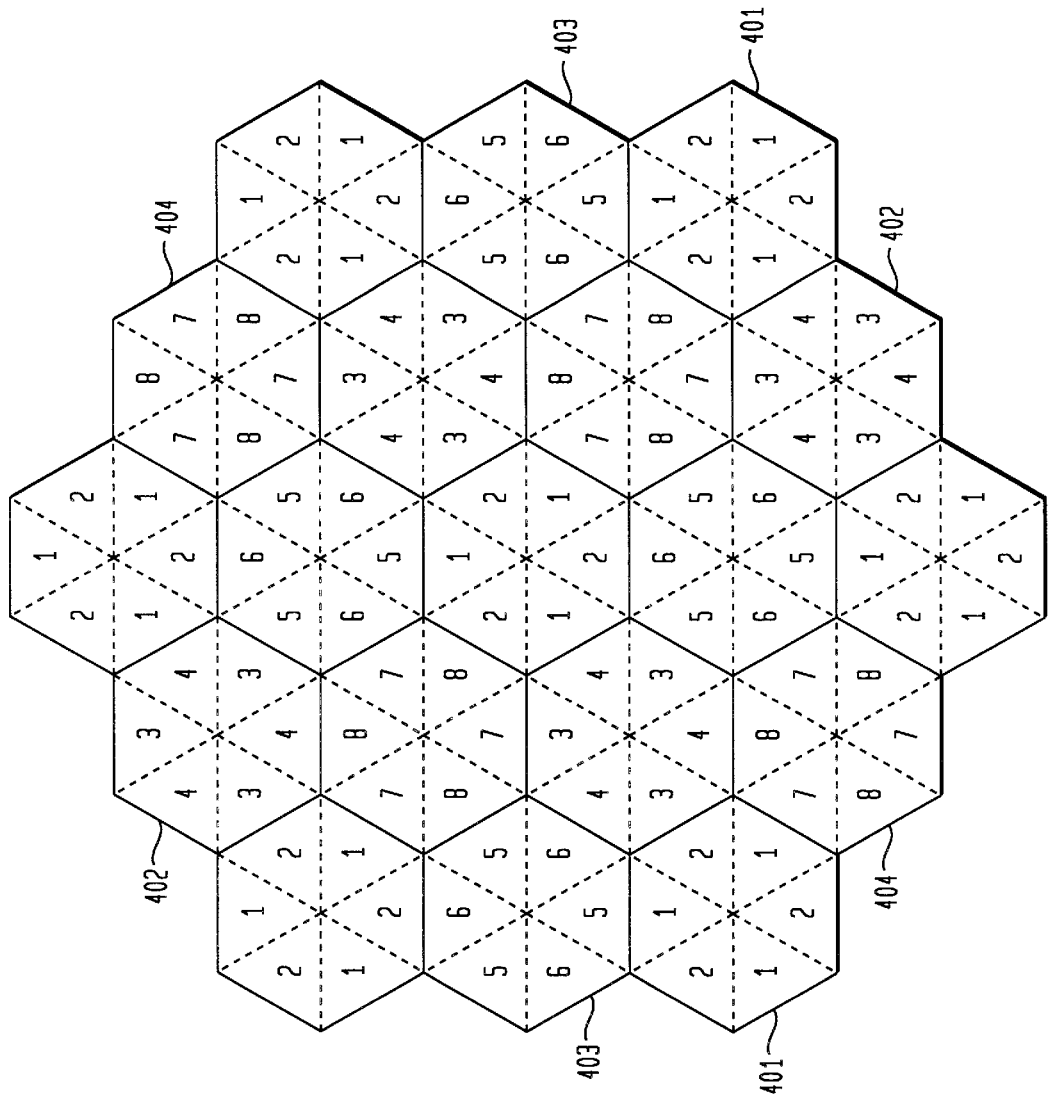
FIG. 4 shows a sector based resource allocation method for a reuse pattern of 4 according to an embodiment of the present invention.
Figure 5:
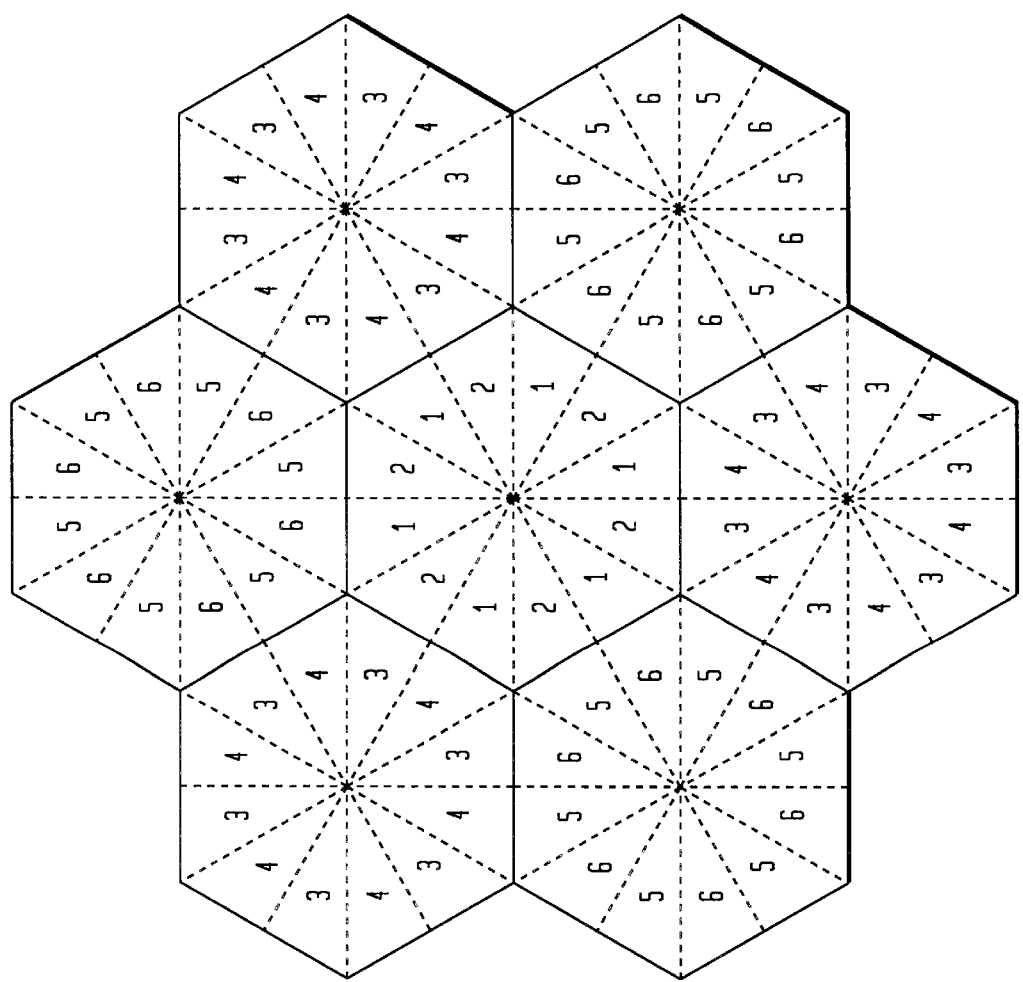
FIG. 5 shows an example of sector based resource allocation with 12 sectors according to an embodiment of the present invention.

Reuse patterns besides the one shown in FIG. 3 can also be used with SBRA. FIG. 4 shows four types of cells 401, 402, 403, 404 where sectors in each cell types are labeled by i and i+1 for i=1, 3, 5 and 7, respectively. The four labeling patterns further reduce co-channel interference, which may be needed for higher SIR threshold requirements. The SBRA method can also be applied to settings with 7, 12 and other labeling patterns, in a way similar to the traditional frequency reuse patterns used in cellular networks. The SBRA scheme can also support a different number of sectors in each cell if the antenna characteristics meet system requirements. An example with 12 sectors/cell and a reuse of 3 is shown in FIG. 5. In each of the patterns shown in FIGS. 3 to 5, there is no co-channel interference from adjacent sectors or the first-tier of neighboring cells because each sector i uses only time slots of subframe i.

SBRA also achieves a high capacity with an overall reuse factor of 1. Suppose that X packets can be transmitted in one time frame. In the SBRA scheme of FIG. 3, for example, each sector transmits X/6 packets per time frame, and with 6 sectors per cell there is a total throughput of X packets per frame at each cell. This is equivalent to an overall reuse of 1. In general, the overall throughput per cell is SX/F packets/frame, where S is the number of sectors per cell, and F is the number of sub-frames (or number of labels). Note that such packets are transmitted at the highest data rate for a given frequency spectrum.

Figure 6A:
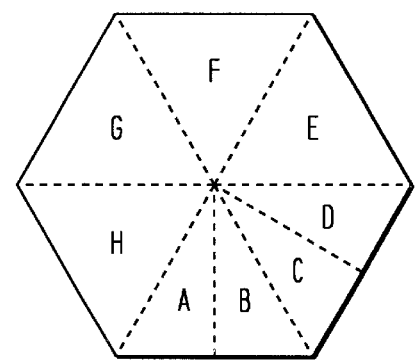
FIG. 6a shows an example of unequal sector layout according to an embodiment of the present invention.
Figure 6B:
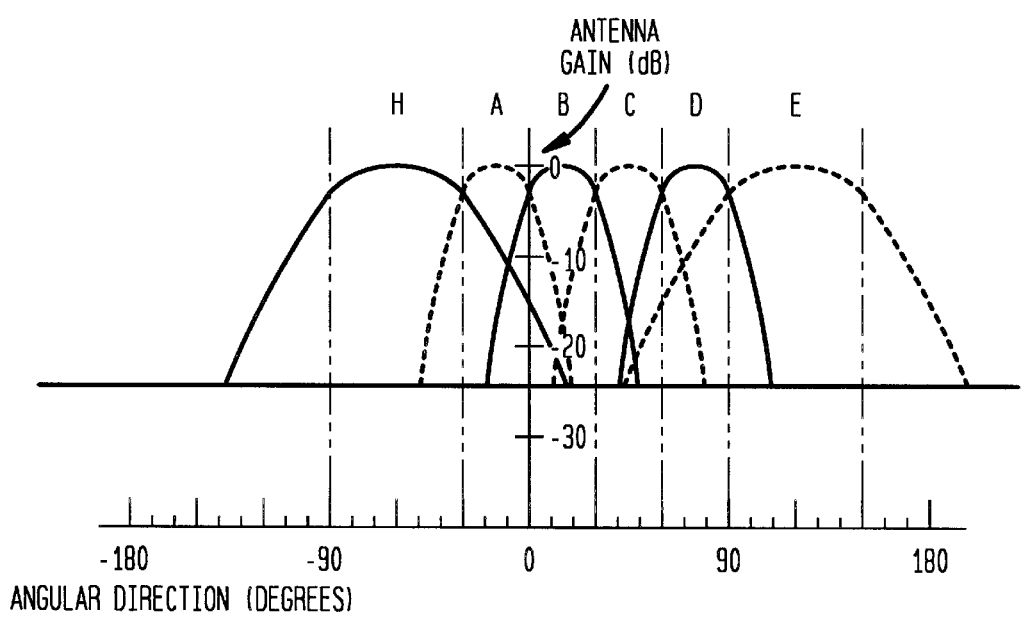
FIG. 6b shows antenna patterns required to support the sector layout of FIG. 6a according to an embodiment of the present invention.

SBRA can also be used with irregular sector plans where the number of sectors and their corresponding beamwidth vary from cell to cell. The only constraint is that each cell should have an even number of sectors with sectors alternately labeled i and i+1. Practical antenna design considerations could also constrain the difference in angular sizes of adjacent sectors. Thus, the sector setting for each cell can be chosen to maximize the utilization of equipment while meeting the anticipated traffic demand. FIG. 6a shows an example of a cell layout with 8 sectors with 4 narrow (30 degree beanwidth) and 4 wide (60 degree beamwidth) sectors. For illustration purposes, these sectors are identified by A to H in the figure, but they will have labels i and i+1 alternately, as discussed above. FIG. 6b depicts antenna patterns that would keep the intra-cell SIR within tolerable limits for the cell shown in FIG. 6a. Flexible sector planning is possible because SBRA does not rely on the alignment of the sectors in other cells, in contrast to the SRA scheme.

Due to the flexibility of sector planning, SBRA permits sector splitting, which allows easy network capacity growth for an existing system. When the traffic load for a sector exceeds capacity, the sector can be split into smaller sectors, each of which has roughly the same capacity as the original sector. Of course, antenna pattern characteristics will constrain the type of sector splits that may be feasible. If multi-beam smart antennas are used, it may be possible to reconfigure the antennas at the time of sector splitting without need for replacement. Such multi-beam antennas may have less constraints in the type of sector plans that can be supported. Note that with other resource allocation techniques, sector splitting can upset the careful packet scheduling necessary to manage interference. The operation of an SBRA system remains unchanged when a sector is split, a major advantage compared to cell splitting, which requires new bases and re-pointing of terminal antennas. Commercially available directional antennas could support a maximum of 12 to 24 sectors, depending on SIR requirements. Thus, the system is capable of supporting a large number of users before cell splitting is really required.

Figure 7:
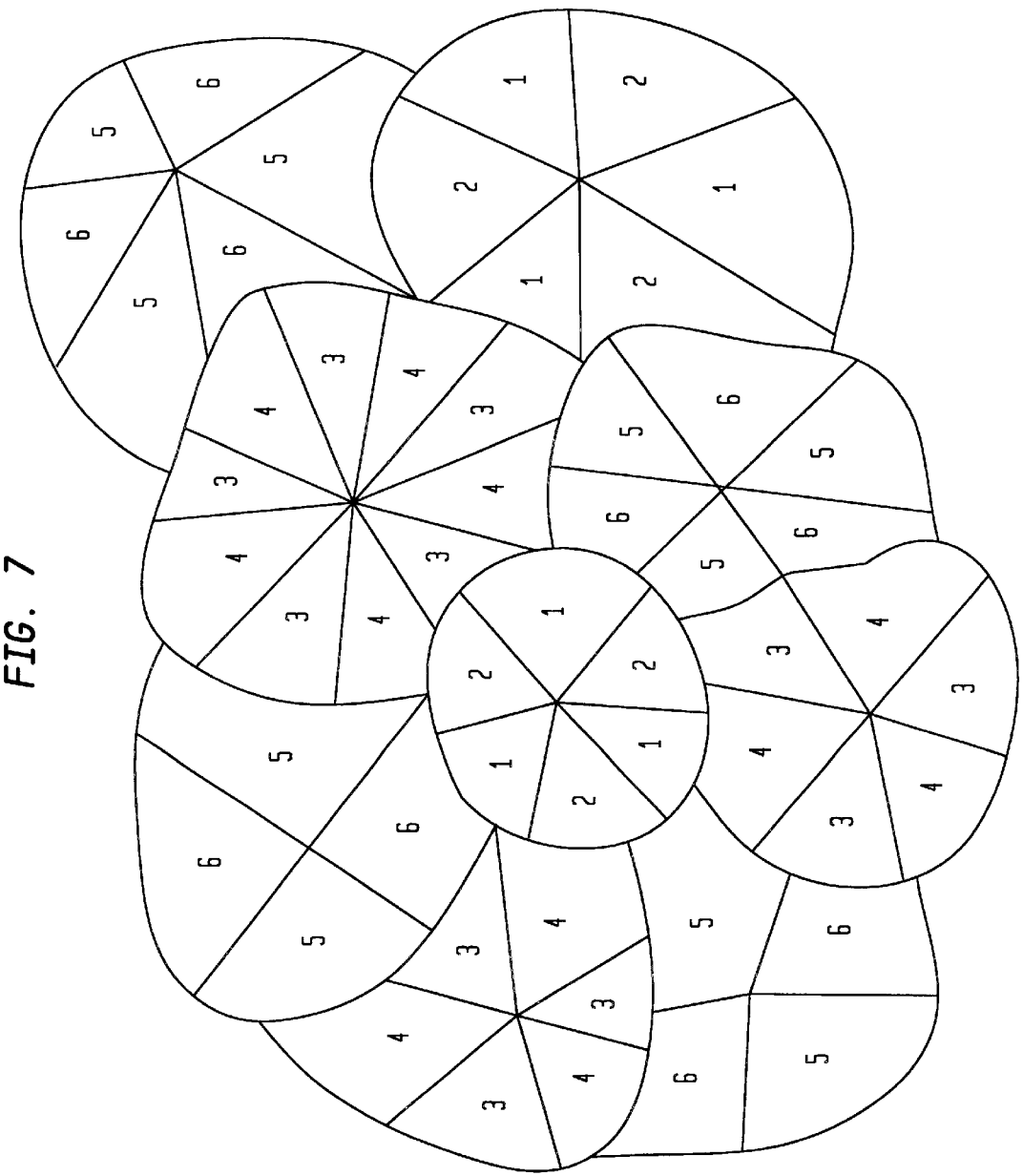
FIG. 7 shows a sector based resource allocation method for an irregular cell and sector layout having a 3 labeling pattern according to an embodiment of the present invention.

Consider a system having only limited available locations for base stations and non-uniform traffic density. Such system constraints could give rise to irregular cell sizes and shapes, and the number of adjacent cells and the amount of common boundary with each cell, will vary. For a given system, cell shapes are typically determined by the process of sector selection, when each terminal chooses the sector that results in the best SIR. Because SBRA does not use the same labeling pattern in adjacent cells, various algorithms could be used to assign such labeling patterns. FIG. 7 depicts an SBRA irregular cell and sector layout with a reuse of K=3 labeling patterns and 2K=6 subframes are needed. As discussed above, various cells can have different sector plans.

Figure 8:
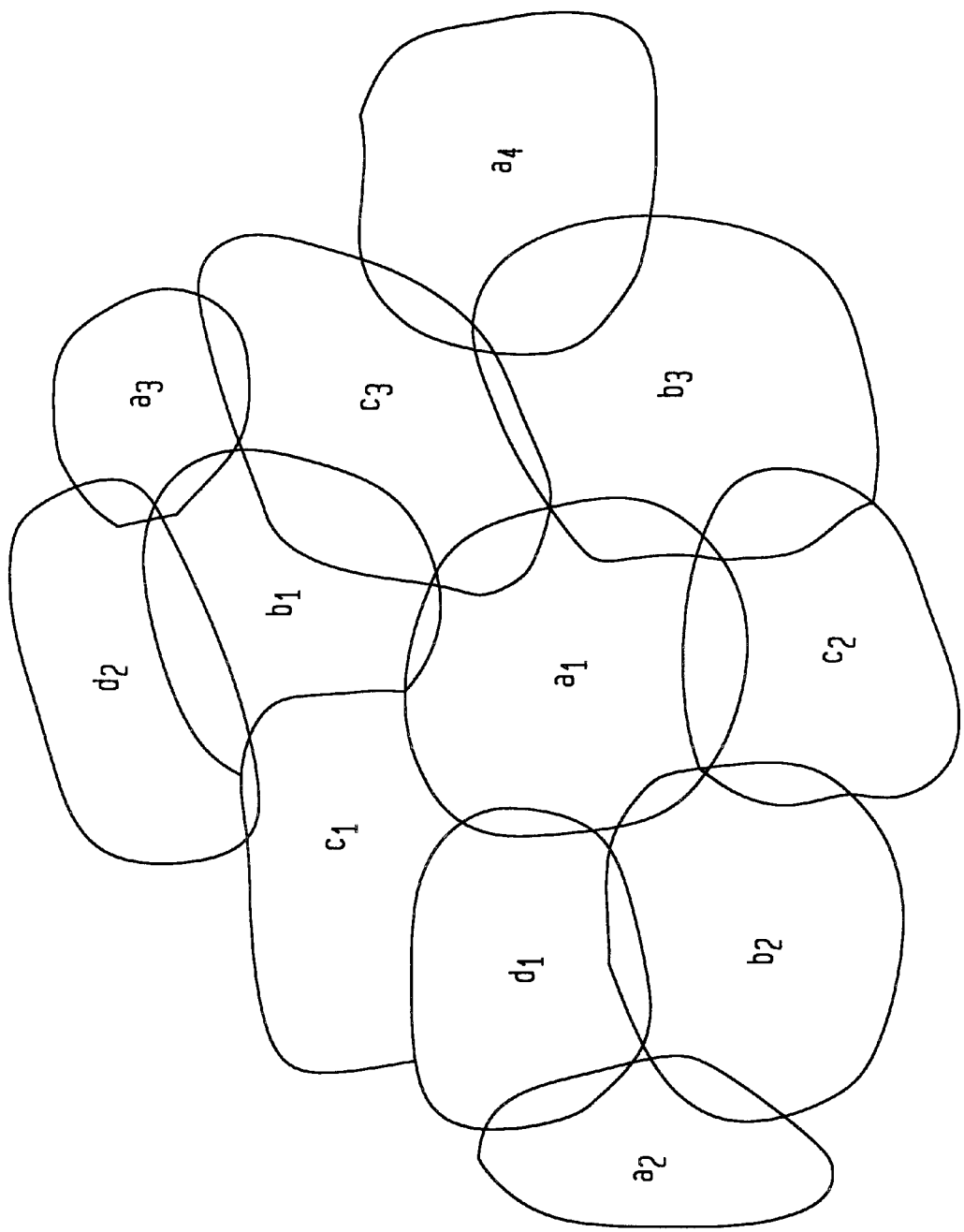
FIG. 8 shows a sector based resource allocation method with non-uniform labeling according to an embodiment of the present invention.

Capacity can be further enhanced in an irregular system if reuse requirements vary across the system. An example system layout is shown in FIG. 8 in which K=4 is the number of labeling patterns required. Cells are labeled with one of the four cell type labeling patterns a, b, c and d. Sectors (not shown in FIG. 8) in cell a, b, c and d could be labeled by 1 and 2, 3 and 4, 5 and 6, and 7 and 8, respectively. A subscript is added to identify each cell, i.e. $b_2$ and $b_3$ use the same labeling pattern. Note that cells $a_1$, $b_1$, $c_1$ and $d_1$ are the only group where each cell is very close to all others in the group; thus requiring all four labeling patterns. In other cases, 3 rather than 4 cells meet at a boundary. As a result, cells have neighbors which use a total of either two or three different patterns. Note also that cells with neighbors using only two labels are either edge-cells, or have an even number of neighboring cells. As an illustration, the neighbors of cell $c_2$ use type a or b, while the neighbors of cell $c_1$ use a, b, or d.

Figure 9A:
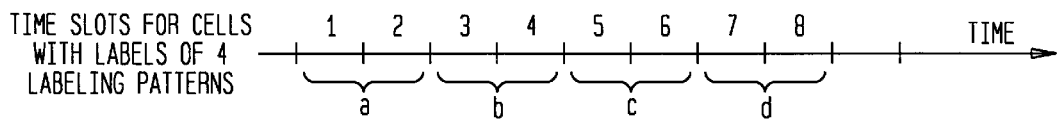
FIGS. 9a to 9e show frame structures in a sector based resource allocation method according to an embodiment of the present invention.

FIGS. 9a to 9e depict time frame structures for use in the system layout shown in FIG. 8. For example, FIG. 9a depicts eight subframes and a sector with label i can only communicate in subframe i. This straight-forward approach may result in a waste of bandwidth in some cells. Using the present invention, non-uniform labeling can be used to improve the bandwidth usage and system throughput as follows.

Figure 9B:
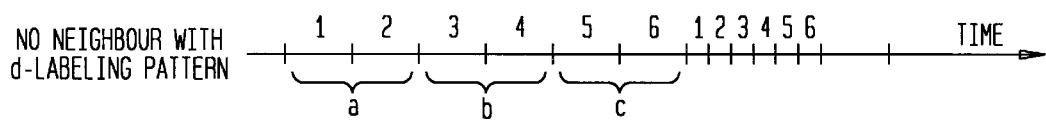

To illustrate the idea, several examples will be given. First, assume that a cell (e.g., cell $c_2$) does not have a neighboring cell with the d labeling pattern. In this case, time subframes 7 and 8, normally used by cell d, can be divided into six mini-frames, indexed by 1 to 6 as shown in FIG. 9b. Thus, in addition to subframes 5 and 6, cell $c_2$ can also communicate in mini-frames 5 and 6. This is feasible because first-tier neighboring cells will not interfere with transmissions in the mini frames. Further, cell $b_3$ can use subframes 3 and 4 as well as mini-frames 3 and 4.

Figure 9C:
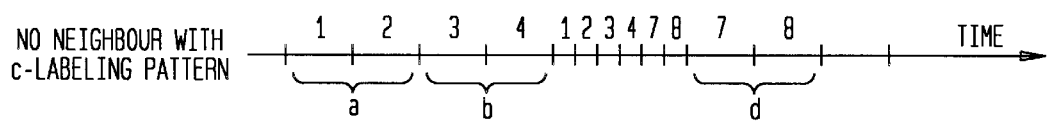
Figure 9D:
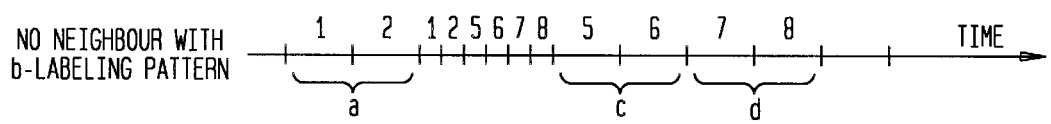
Figure 9E:
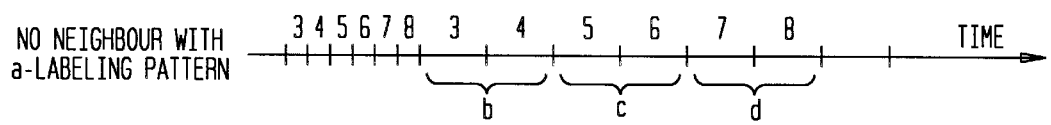

Similarly, as shown in FIGS. 9c to 9e, the corresponding subframe can be divided into mini-frames and used by cells with no neighbors having the associated labeling pattern. In an extreme situation, if a cell has only one neighbor, it can use slots in two sets of two mini-frames, derived from four subframes that could have been used by the missing neighbors.

Note that the localized reuse concept is different from time slot reuse in TSRP, although the two concepts can certainly be merged in a hybrid scheme. In the system of FIG. 8, TSRP would assign time subframes for reuse of 3 and 4 across the system and assign terminals to one or the other. The localized reuse takes a cell-by-cell approach, and if a cell does not require to participate in a reuse of 4, time slots are used in a manner that does not waste subframes set aside for a reuse of 4.

Figure 1:
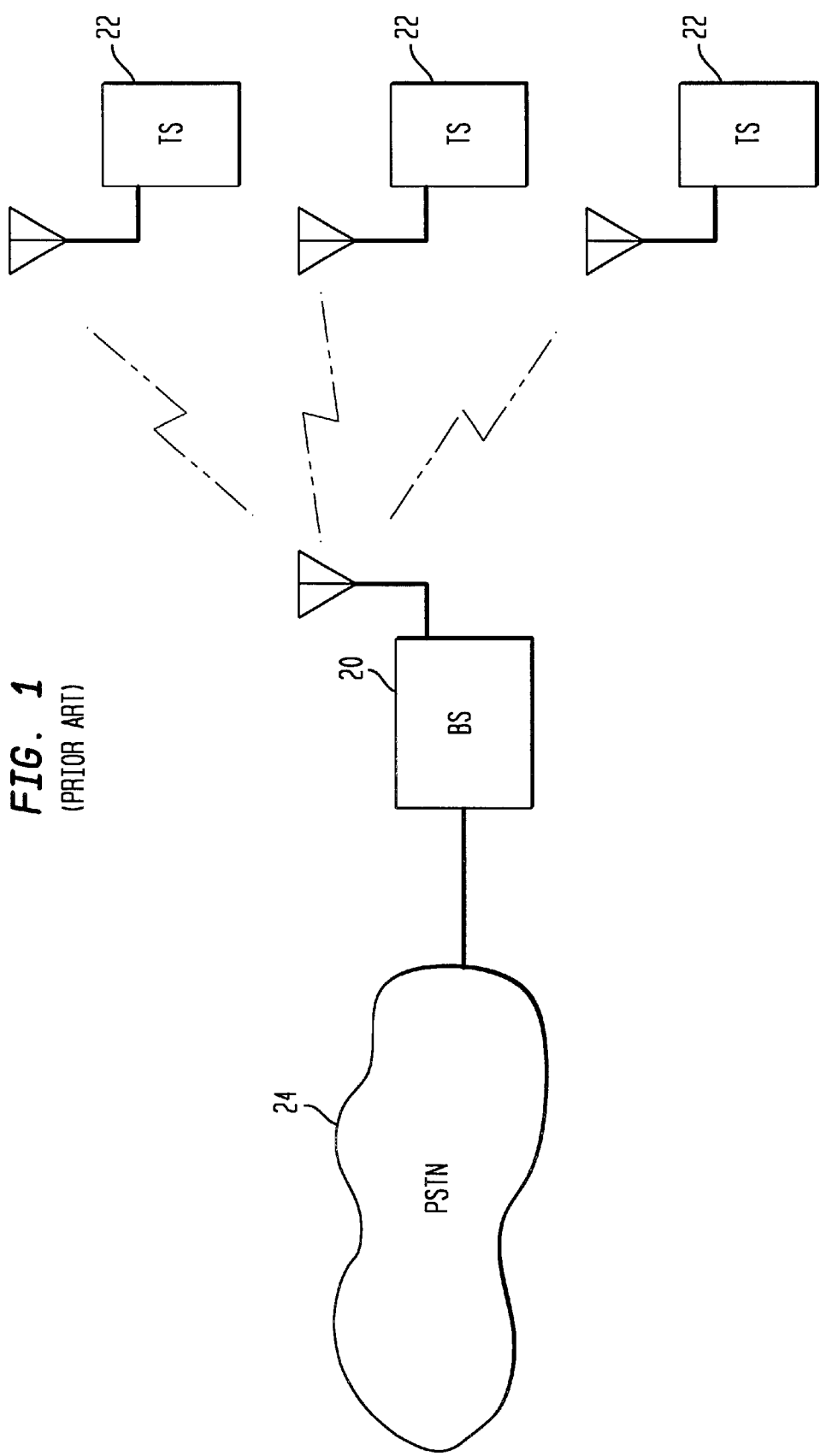
FIG. 1 is a block diagram of a typical wireless communication system suitable for an embodiment of the present invention.
Figure 2:
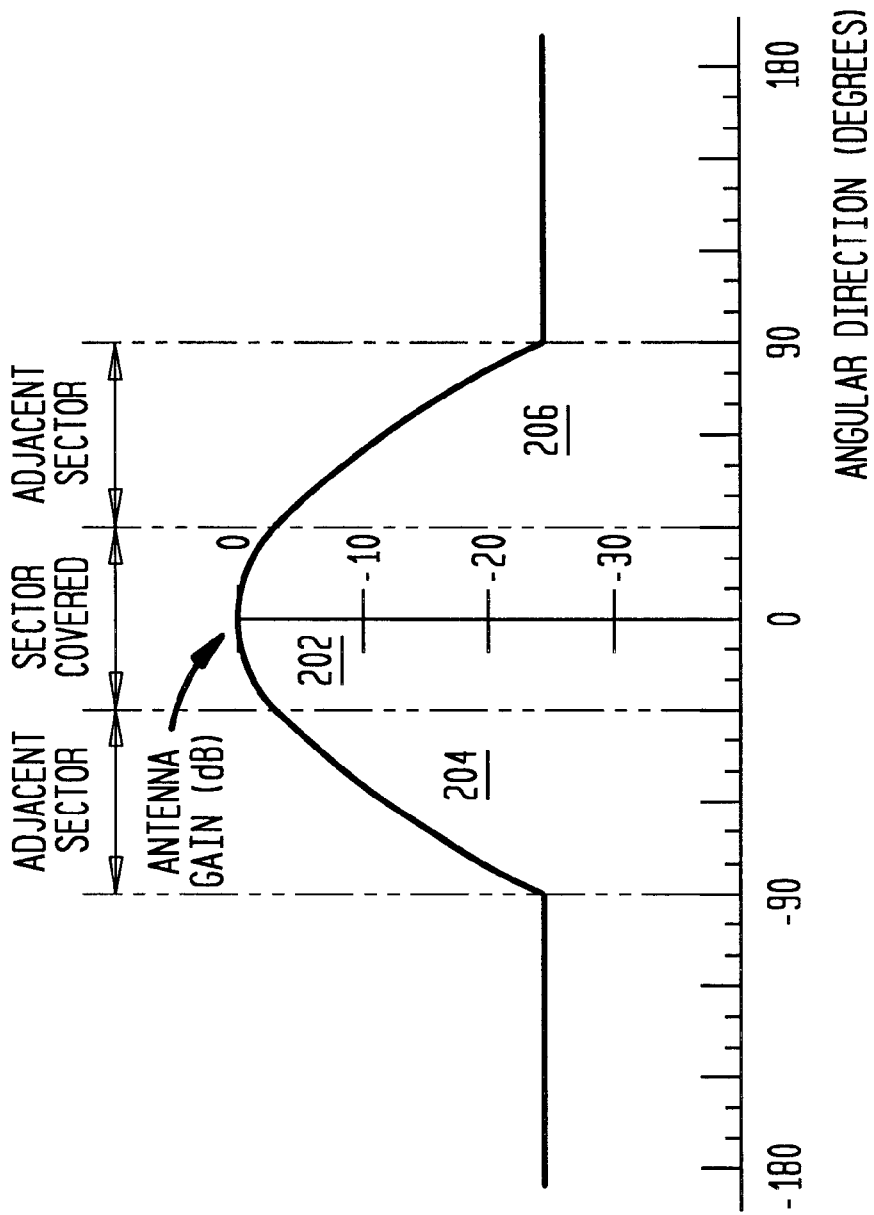
FIG. 2 shows a representative directional antenna pattern with 60 degrees beamwidth and a FTB ratio of 25 dB.

A simulation model created with OPNET, a computer-aided engineering tool for communication networks and analysis developed by MIL 3, Inc. of Washington, D.C., was used to numerically evaluate the performance of the downlink of the SBRA scheme. The system studied had a regular hexagonal cell layout of 38 cells, representing three tiers of interferers for a center cell, with six sectors per cell. A reuse pattern of three as shown in FIG. 2 was used. Numerical results are presented for the worst-case downlink interference.

Performance was studied in one sector of the center cell in a manner representative of the total system. 1000 terminals were placed in a uniform grid covering the triangular sector. Path losses to each base station were calculated, and independent lognormal deviates were used to simulate the shadow fading between each terminal and each base station. Fading loss to all six sectors of the same base station was assumed to be the same. Sector selection was done for each terminal as follows. The downlink SIR was evaluated assuming placement of a terminal in each of the neighboring candidate sectors, i.e. the terminal antenna was pointed towards candidate base station and interference evaluated from each of the 75 co-channel sectors. The sector assignment with the largest SIR was chosen, and this was the downlink SIR for that terminal. Unless specified otherwise, numerical results were generated for different variations on the following reference set of parameters:

Number of sectors per cell: 6
Base station antenna FTB ratio: 25 dB
Sector antenna beamwidth: 60 degrees
Terminal antenna FTB ratio: 15 dB
Terminal antenna beamwidth: 30 degrees
Antenna pattern (scaled as needed): as shown in FIG. 2
Log normal fading standard deviation: 8 dB
Path loss exponent: 4

All results are shown as the cumulative distribution function of the SIR at the terminals, i.e. for a SIR of 15 dB on the X axis, the Y-axis reads the probability that SIR<15 dB. The value on the Y-axis is thus an SIR-outage measure. A Y-axis value of 0.01 indicates the minimum SIR available if the 1% of problem terminals were removed, i.e. 99% cell coverage. This coverage relates to statistics of SIR at fixed user locations, and has no time component as with systems that consider mobility or time-varying fading.

Figure 10:
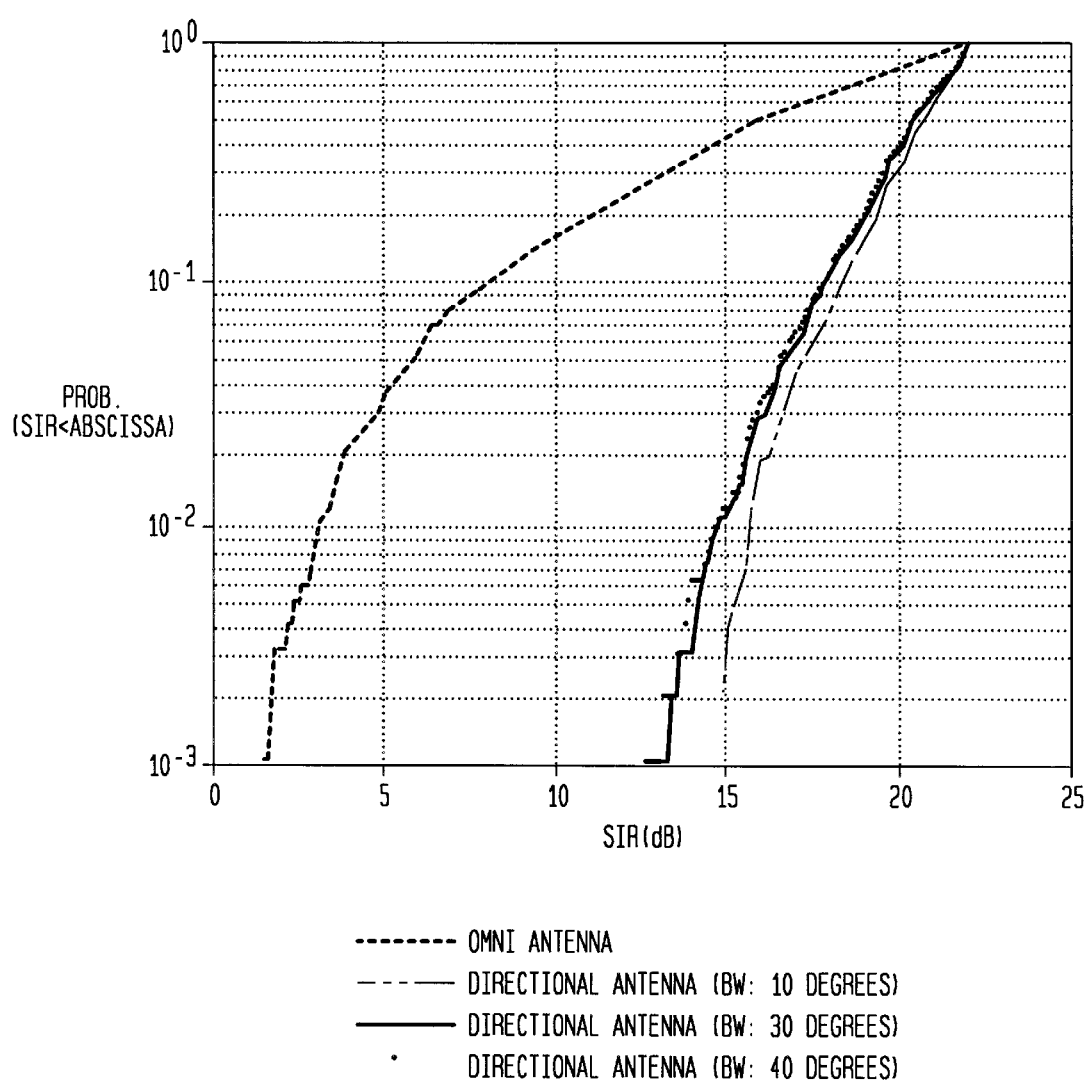
FIG. 10 shows the reduction of interference using directional antenna at the terminal according to an embodiment of the present invention.

FIG. 10 illustrates the value of directional antennas by comparing the performance with omni-directional terminal antennas and directional terminal antennas with beamwidths of 10, 30, and 40 degrees. For an SIR outage of 1% (99% coverage), the SIR is 14.5 dB for the reference case of 30 degrees and 3 dB for the omni case. It is clear that directional terminal antennas are required, and this is the principal reason that this system performs very much better than a typical cellular system with omni terminals, which cannot work with a re-use factor of 3 for a 17 dB SIR requirement. The fact that terminal antenna beamwidth is not very critical in the range from 10 to 40 degrees may imply a wide tolerance to antenna beamwidths and pointing errors.

Figure 11:
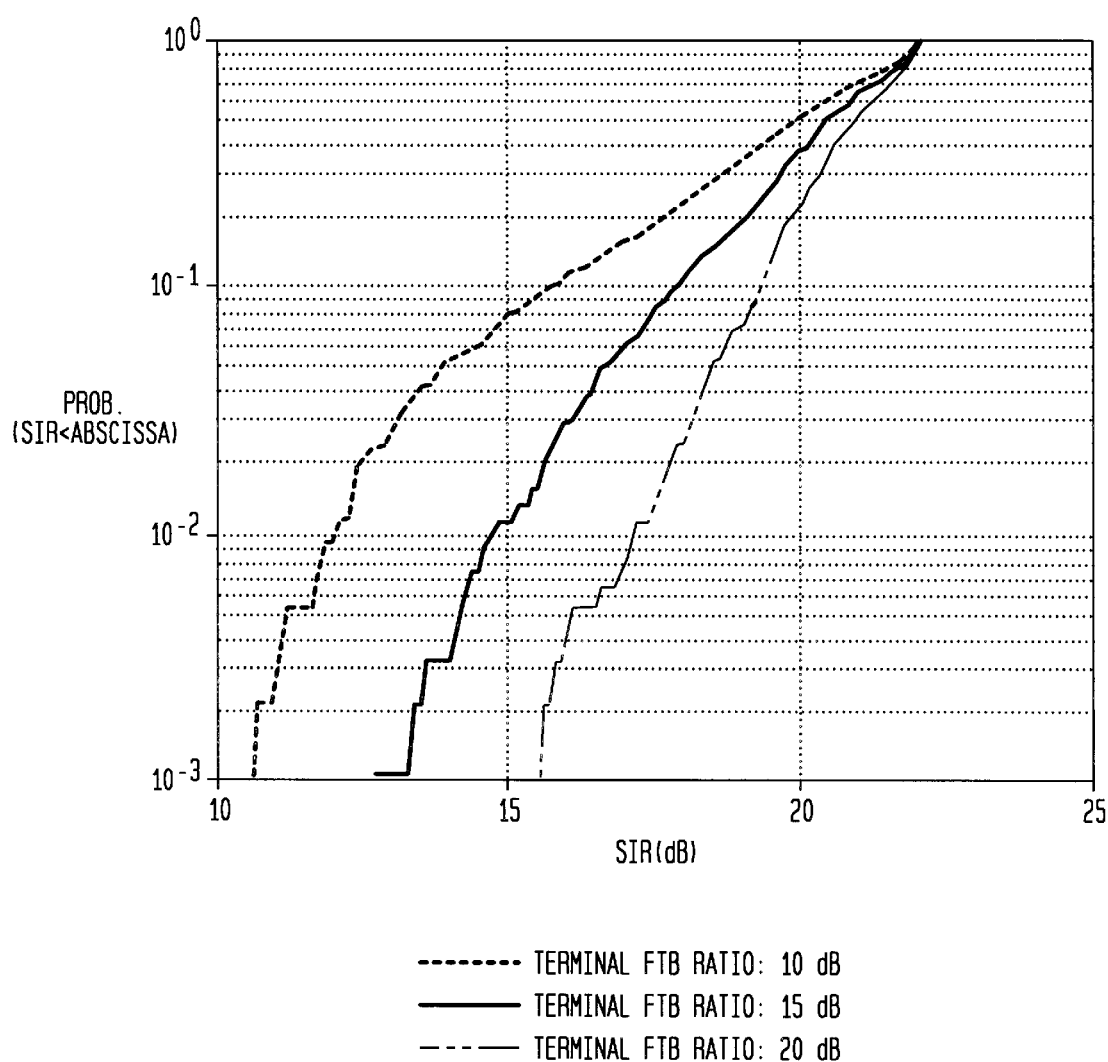
FIG. 11 shows the SIR for different FTB ratios of terminal antenna according to an embodiment of the present invention.

FIG. 11 illustrates the importance of the terminal FTB ratio. The SIR curves are shown for FTB ratios of 10 dB, 15 dB, and 20 dB. For 99% coverage, the achieved SIR is 12 dB, 14.5 dB, and 17 dB respectively. The SIR does not exceed 22 dB due to the fact that the base antenna FTB has been chosen as 25 dB and there are two interfering transmissions from the same base that transmits the signal. For each 5 dB drop in FTB ratio, the SIR drops by 2.5 dB. Note that a terminal antenna with a free-space FTB ratio of 20 dB has an effectively lower interference suppression of 15 dB to 10 dB in the presence of strong local scatterers.

Figure 12:
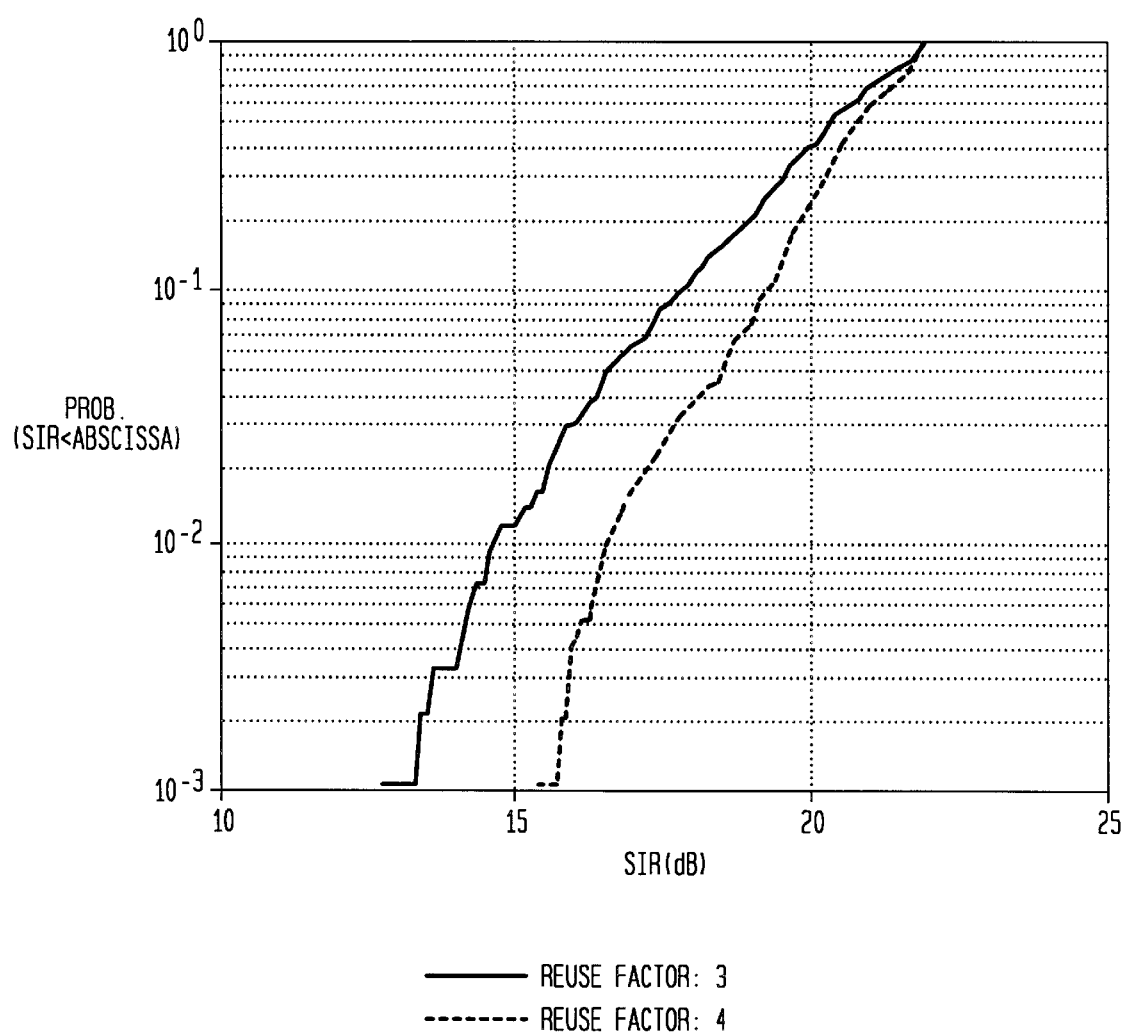
FIG. 12 shows the SIR distribution for two reuse factors according to an embodiment of the present invention.

FIG. 12 shows the improvement in performance for a regular hexagonal system having a reuse factor of 4 instead of 3. The 99%-coverage SIR value increases from 14.5 dB to about 16.5 dB and provides a margin for variation in cell sizes that might lead to closer co-channel cells.

Figure 13:
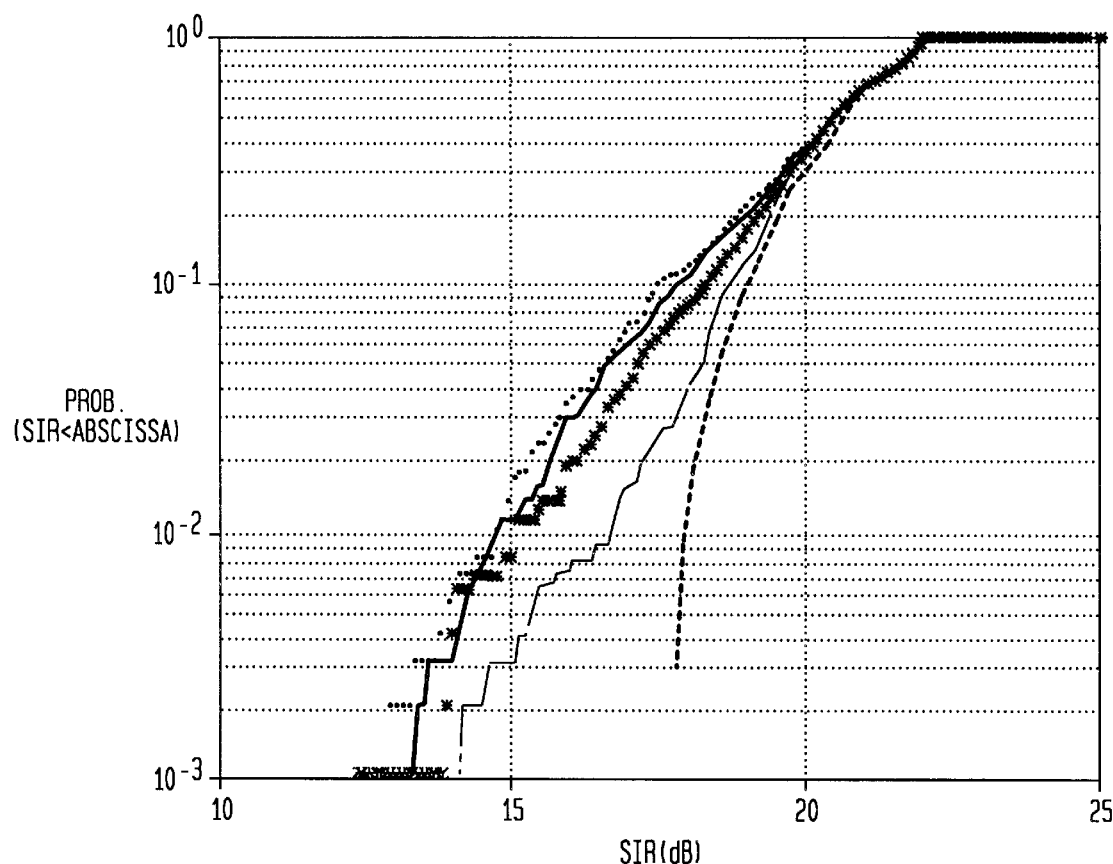
FIG. 13 shows the SIR distribution for different values of standard deviation of lognormal fading according to an embodiment of the present invention.

FIG. 13 shows the effect of lognormal shadow fading. Besides varying the signal and interference conditions at the terminal, certain fading conditions can also cause a terminal to change sectors. Thus, extreme cases of adverse fading (low signal, high interference) are avoided by the macrodiversity offered by sector selection. For 0 dB (no fading), 4 dB and 8 dB, the 99%-coverage SIR is 18 dB, 16.5 dB, and 14.5 dB respectively. A confidence sensitivity analysis with 5 different random seeds for lognormal fading shows an SIR variation of up to 0.5 dB for the 99% coverage in the reference case.

Figure 14:
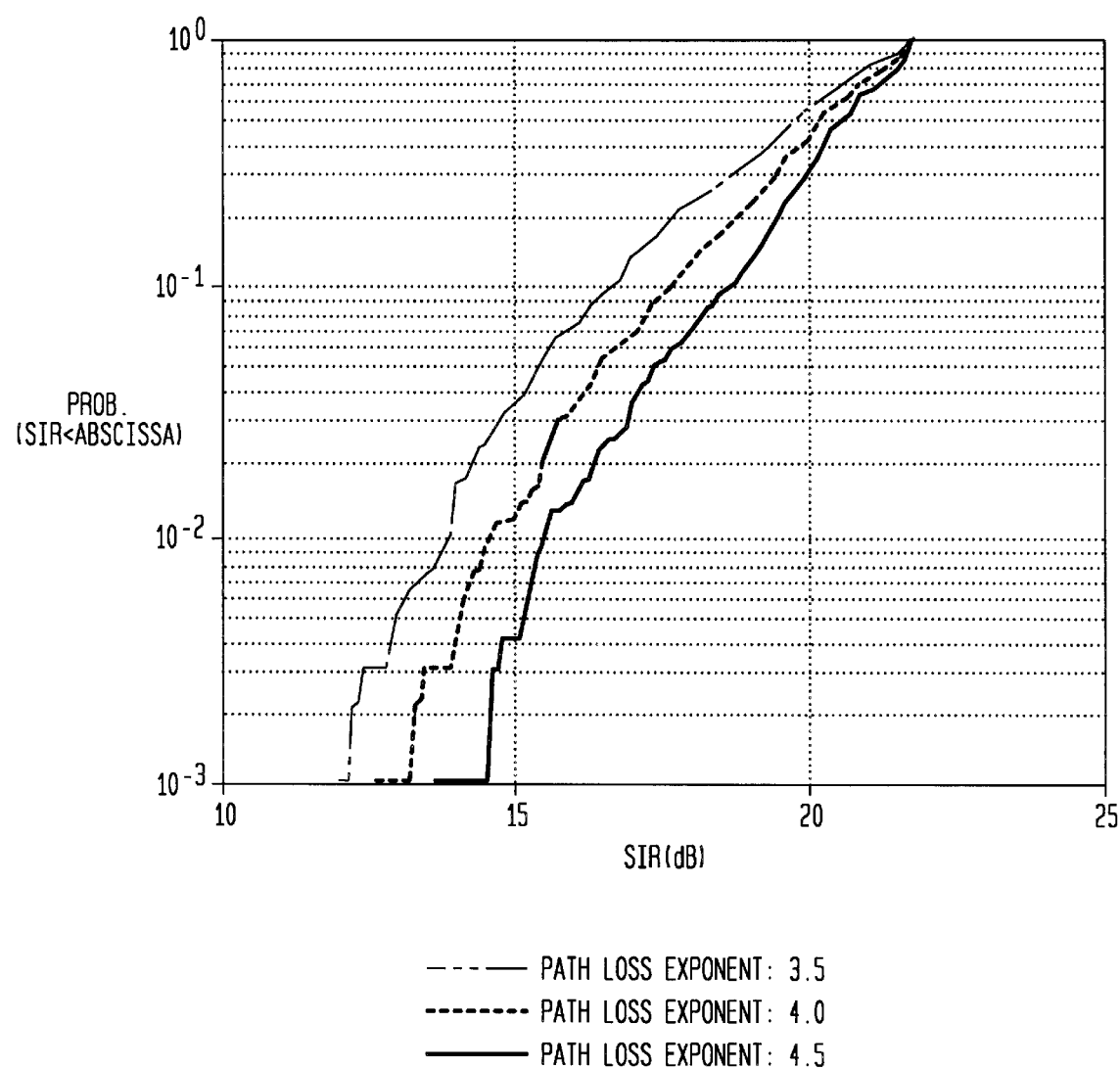
FIG. 14 shows the SIR distribution for different values of path loss exponent according to an embodiment of the present invention.

FIG. 14 shows results for different values of path loss exponent. Higher path loss exponents, as may be the case with different base heights, cause more rapid signal loss with distance and less inter-cell interference. The range of 3.5 to 4.5 might be expected for different types of radio environment. The 99% coverage SIR value for path losses of 3.5, 4, and 4.5 are 14 dB, 14.5 dB and 15.5 dB respectively.

FIG. 15 shows SIR results using different numbers of sectors per cell. The 1% SIR outage for 6, 10 and 12 sectors are 14.5 dB, 14 dB, and 13.3 dB respectively. Again, the SIR penalty is small for a larger number of sectors, thus establishing the feasibility of capacity growth by sector splitting.

In summary, SBRA is a robust scheme that uses the combination of directional antennas and time reuse to effectively combat co-channel interference in fixed wireless systems. For reasonable choices of system parameters and SIR of about 12 to 14 dB, the scheme delivers high capacity, while permitting a given band of frequencies to be re-used in every sector of every cell. With a reuse factor of 3, SBRA is very suitable for a hexagonal cell layout for the reference parameters if the SIR required is about 13 dB. With Quadrature Phase-Shift Keying (QPSK) modulation, and a $10^{-6}$ bit error rate, this leaves a penalty margin of about 3 dB for fast fading after counteractions like coding and diversity. For six sectors, the overall reuse factor is 1, i.e. each cell makes full use of every time frame in the same frequency band. For irregular cell layouts, a reuse of 4 appears to be sufficient for the very irregular parts of the system, and the localized reuse concepts allow us to use both reuse patterns in different areas of the system. SBRA provides flexible sector planning and flexible re-use patterns for irregular cell layout, non-uniform traffic density, and easy capacity growth.

Although various embodiments are specifically illustrated and described herein, it will be appreciated that modifications and variations of the present invention are covered by the above teachings and within the purview of the appended claims without departing from the spirit and intended scope of the invention. For example, although a time division system was used to illustrate various embodiments of the invention, it can be appreciated that other systems will fall within the scope of the invention. Similarly, although various embodiments of the invention make reference to fixed terminal stations, it can be appreciated that mobile terminal stations fall within the scope of the invention. Another example is the number of sectors and cells discussed in the various embodiments. Another example is that there could be more than 2 labels used in a cell and the number of sectors per cell could be odd. It can be appreciated that other numbers of sectors or cells also fall within the scope of the invention.

What is claimed is:

1. A method for scheduling communications in a communications system having a service region divided into a plurality of irregularly shaped cells, comprising the steps of:
scheduling transmissions, within a fixed wireless communications system, for communications sites within a first irregularly shaped cell, each communications site being located in one of a plurality of labeled sectors within the first irregularly shaped cell, each sector being labeled to avoid an unacceptable amount of interference from any other sector and each irregularly shaped cell having at least two sectors that share same label, wherein each communications site is scheduled to communicate said transmissions in a channel associated with the label of the communications site's sector;
communicating said transmissions according to said scheduling using a multi-beam smart antenna and a directional terminal antenna; and
wherein the number of sectors in the first cell can be dynamically and flexibly changed by reconfiguring the smart antenna, without fixed, pre-assignment of channel patterns and antenna replacement after the communications system has been installed, while maintaining an even number of sectors, for increasing capacity and reducing interference in the system.

2. The method of claim 1, wherein adjacent sectors in the first cell do not have the same label.

3. The method of claim 2, wherein the sectors in the first cell are alternately labeled.

4. The method of claim 3, wherein no label in the first cell is used in any sector of any cell adjacent to the first cell.

5. The method of claim 1, wherein the channel is a time slot.

6. The method of claim 1, wherein said step of scheduling also schedules transmissions for a communications site in a channel associated with a second label, said second label being not used for any sector of any cell adjacent to the first cell.

7. The method of claim 1, wherein the number of sectors within the first cell is 6.

8. The method of claim 7, wherein the plurality of cells have a reuse pattern of 3 with a first type cell using labels 1 and 2, a second type cell using labels 3 and 4 and a third type cell using labels 5 and 6.

9. The method of claim 1, wherein the sectors in the first cell are of non-uniform size.

10. The method of claim 4, wherein the first cell and a second cell of the plurality of cells have different numbers of sectors based on traffic demand.

11. The method of claim 4, wherein the plurality of cells have a reuse pattern of 4.

12. A method for operating a communications system having a service region divided into a plurality of irregularly shaped cells, comprising the steps of:
communicating, within a fixed wireless communications system, in a first channel with a first plurality of communications sites within one of the plurality of irregularly shaped cells, each of said first plurality of communications sites being located in a first of a plurality of labeled sectors within the irregularly shaped cell, each sector being labeled to avoid an unacceptable amount of interference from any other sector and each irregularly shaped cell having at least two sectors that share the same label;
communicating in a second channel with a second plurality of communications sites within the irregularly shaped cell, each of said second plurality of communications sites being located in a second of the plurality of labeled sectors;
wherein said steps of communicating are performed using a multi-beam smart antenna and a directional terminal antenna; and wherein the number of sectors in the cell can be dynamically and flexibly changed by reconfiguring the smart antenna, without fixed, pre-assignment of channel patterns and antenna replacement after the communications system has been installed, while maintaining an even number of sectors, for increasing capacity and reducing interference in the system.

13. The method of claim 12, wherein adjacent sectors in the first cell do not have the same label.

14. The method of claim 13, wherein the sectors in the first cell are alternately labeled.

15. The method of claim 14, wherein no label in the first cell is used in any sector of any cell adjacent to the first cell.

16. The method of claim 12, wherein the first and second channels are time slots.

17. The method of claim 12, wherein said step of communicating with a first plurality of communications sites also communicate in a third channel, said third channel not being used in an adjacent cell.

18. The method of claim 12, wherein the number of sectors within the cell is 6.

19. The method of claim 18, wherein the plurality of cells have a reuse pattern of 3 with a first type cell using labels 1 and 2, a second type cell using labels 3 and 4 and a third type cell using labels 5 and 6.

20. The method of claim 12, wherein the sectors in the cell are of non-uniform size.

21. The method of claim 15, wherein the cell and a second cell of the plurality of cells have different numbers of sectors based on traffic demand.

22. The method of claim 15, wherein the plurality of cells have a reuse pattern of 4.

23. A communications system having a plurality of irregularly shaped cells divided into a plurality of sectors, comprising:

a first communications unit, within a fixed wireless communications system, configured to communicate in a first channel with a first plurality of communications sites within one of the plurality of irregularly shaped cells, each of said first plurality of communications sites being located in a first of a plurality of labeled sectors within the irregularly shaped cell, each sector being labeled to avoid an unacceptable amount of interference from any other sector and each irregularly shaped cell having at least two sectors that share the same label;

a second communications unit, within a fixed wireless communications system, configured to communicate in a second channel with a second plurality of communications sites within the irregularly shaped cell, each of said second plurality of communications sites being located in a second of the plurality of labeled sectors;

a scheduler, within a fixed wireless communications system, for scheduling information for communication in each channel;

wherein said first and second communication units are configured to use a multi-beam smart antenna and a directional terminal antenna; and wherein the number of sectors in the cell can be dynamically and flexibly changed by reconfiguring the smart antenna without fixed, pre-assignment of channel patterns and antenna replacement after the communications system has been installed, while maintaining an even number of sectors, for increasing capacity and reducing interference in the system.

24. The system of claim 23, wherein adjacent sectors in the first cell do not have the same label.

25. The system of claim 24, wherein the sectors in the first cell are alternately labeled.

26. The system of claim 25, wherein no label in the first cell is used in any sector of any cell adjacent to the first cell.

27. The system of claim 23, wherein the first and second channels are time slots.

28. The system of claim 23, wherein said first communications unit is also configured to communicate with the first plurality of communications sites in a third channel, said third channel not being used in an adjacent cell.

29. The system of claim 23, wherein the number of sectors within the first cell is 6.

30. The system of claim 23, wherein the plurality of cells have a reuse pattern of 3 with a first type cell using labels 1 and 2, a second type cell using labels 3 and 4 and a third type cell using labels 5 and 6.

31. The system of claim 23, wherein the sectors in the cell are of non-uniform size.

32. The system of claim 23, wherein the cell and a second cell of the plurality of cells have different numbers of sectors based on traffic demand.

33. The system of claim 23, wherein the plurality of cells have a reuse pattern of 4.

* * * * *

UNITED STATES PATENT AND TRADEMARK OFFICE
CERTIFICATE OF CORRECTION

PATENT NO. : 6,400,697 B1
DATED : June 4, 2002
INVENTOR(S) : Leung et al.

It is certified that error appears in the above-identified patent and that said Letters Patent is hereby corrected as shown below:

<u>Title page, item [54] and Column 1, line 3,</u>
Replace the word "BROADHAND" with -- BROADBAND --

Signed and Sealed this

Eighth Day of October, 2002

*Attest:*

*Attesting Officer*

JAMES E. ROGAN
*Director of the United States Patent and Trademark Office*